United States Patent [19]

Ullmann et al.

[11] 4,242,556
[45] Dec. 30, 1980

[54] GUIDING AND STRESSING AN ELONGATED, STRETCHED, RENEWABLE ELECTRODE IN ELECTRO-EROSIVE MACHINING

[75] Inventors: Werner Ullmann, Locarno; Bernd Schumacher, Losone; Herbert Ruh; Beat Kilcher, both of Ascona, all of Switzerland

[73] Assignee: A.G. für Industrielle Elektronik AGIE, Losone b. Locarno, Switzerland

[21] Appl. No.: 896,141

[22] Filed: Apr. 13, 1978

Related U.S. Application Data

[63] Continuation of Ser. No. 731,783, Oct. 12, 1976, abandoned.

[30] Foreign Application Priority Data

Nov. 10, 1975 [CH] Switzerland .................. 14514/75

[51] Int. Cl.³ .............................................. B23P 1/12
[52] U.S. Cl. ............................... 219/69 W; 219/69 M; 242/155 R
[58] Field of Search ............... 219/69 W, 69 E, 69 V, 219/131 F; 242/155 R

[56] References Cited

U.S. PATENT DOCUMENTS

| 2,306,835 | 12/1942 | Tucker et al. ............... 242/155 R |
| 2,605,061 | 7/1952 | Howe ............................ 242/155 R |
| 3,486,713 | 12/1969 | Freiman ....................... 242/155 R |
| 3,822,374 | 7/1974 | Ullmann et al. ............. 219/69 W |
| 3,912,899 | 10/1975 | Lehmann et al. ........... 219/69 W |
| 4,016,395 | 4/1977 | Rietzeld ....................... 219/69 W |

FOREIGN PATENT DOCUMENTS 2027240 8/1971 Fed. Rep. of Germany.

*Primary Examiner*—C. C. Shaw
*Attorney, Agent, or Firm*—Frishauf, Holtz, Goodman & Woodward

[57] ABSTRACT

To provide constant tension on an electro-erosive electrode machining wire, tape or ribbon stretched in a working path between advancing rollers and pulling rollers, a tension loading arrangement, for example weights, springs, or the like, are applied to the wire to maintain the tension thereof at a constant value. The deflection of the wire, due to elongation thereof as a result of heating, differences in manufacturing technologies and the like, is sensed and fed back to the motors driving the advancing and pulling rotors to maintain the tension, as controlled by the motor torques and speeds at a uniform value.

6 Claims, 1 Drawing Figure

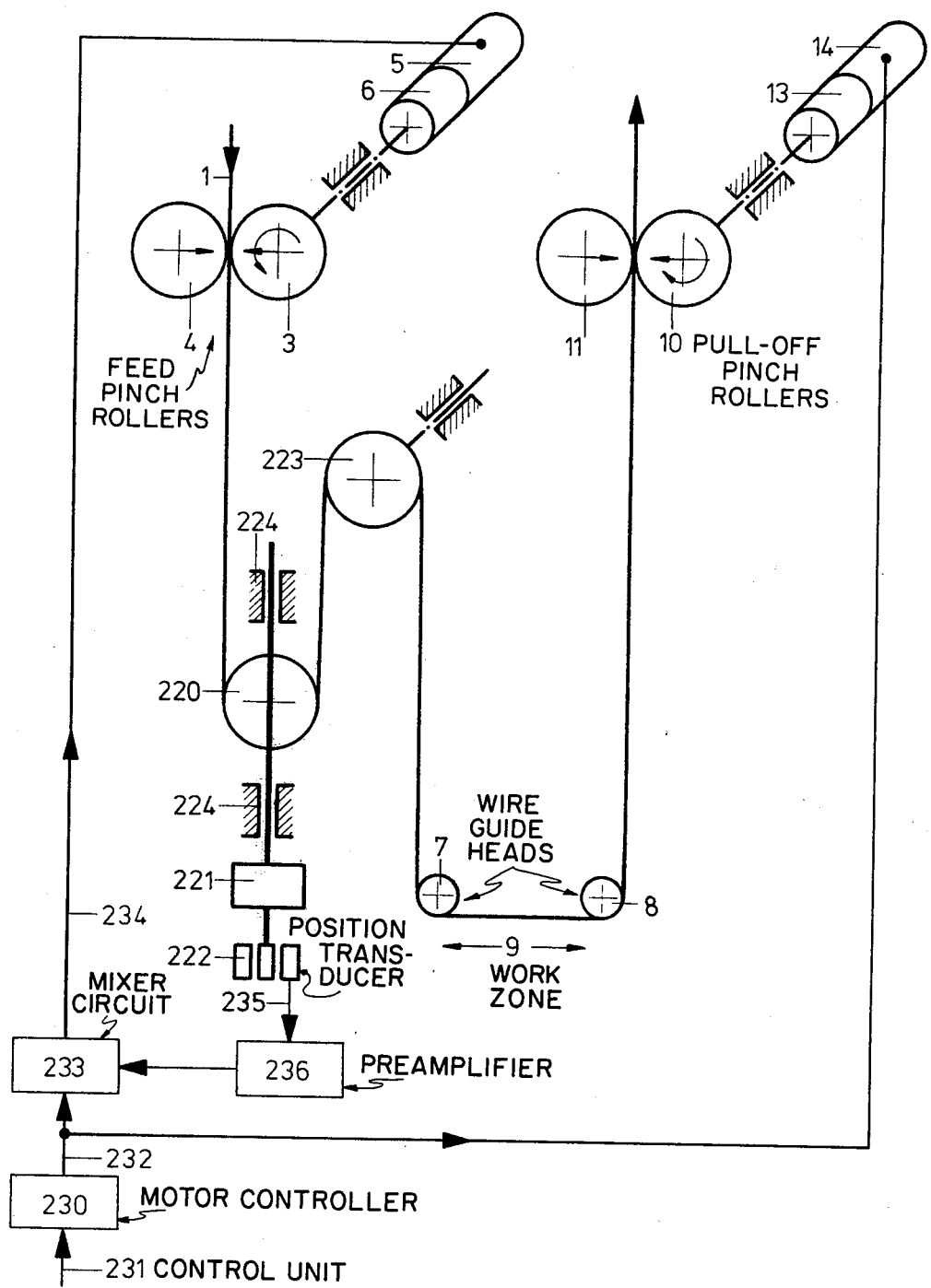

GUIDING AND STRESSING AN ELONGATED, STRETCHED, RENEWABLE ELECTRODE IN ELECTRO-EROSIVE MACHINING

This is a continuation, of application Ser. No. 731,783, filed Oct. 12, 1976 abandoned.

Cross reference to related patents, all assigned to the assignee of the present application: U.S. Pat. Nos. 3,822,374, 3,731,043, 3,731,045, 3,830,996, 3,928,163 ULLMANN et al., of which the present application is an improvement; and which are particularly related to electrical discharge cutting with the claimed wire pulling and guiding system.

The present invention relates to guiding an elongated electrode for electro-erosive working on workpieces, and more particularly relates to an improvement in the apparatus disclosed in cross-referenced U.S. Pat. No. 3,822,374, the disclosure of which is hereby incorporated by reference.

The specification and claims will use the term "wire electrode"; it is to be understood that this electrode includes also electrodes of metal tape or metal ribbon. Metal tapes or ribbons are, essentially, wires of considerably flattened cross section. Accordingly, the words "tape" and "ribbon" do not appear in the appended claims and in the specification to follow, but the word "wire" is used instead in the broad sense just mentioned.

The cross-referenced U.S. Pat. No. 3,822,374, which also uses "wire" in the same sense, relates to guiding a wire electrode in a working path, in which the electrode is guided from a supply through a pair of advancing pinch rollers over guide elements, typically guide rollers, to a working path, and then over another guide roller to a take-up or pulling pinch roller pair to be spooled on a take-up spool to hold used and usually deteriorated work electrode material. It is important to maintain the tension of the wire electrode constant, and particularly to maintain that tension at a predetermined value within the elastic or plastic deformation region of its material. The pinch rollers pairs are driven by electric motors at selected speeds. The motor driving the take-up or pulling pinch roller pair operates at a slightly higher speed than that of the supply or advancing pinch roller pair to compensate for the desired stretch or elongation of the electrode in the working path.

Electro-erosive or electro-chemical cutting of workpieces by means of a wire electrode is carried out by guiding the electrode in a geometrically defined working path by the feed rollers, for example as controlled by a servo mechanism. Guidance is effected with respect to the workpiece such that the workpiece is properly worked on. To provide for proper working, the longitudinal tension must be maintained at predetermined values. The wear on the electrode during the working process is compensated by continuous supply of new electrode material from a supply reel; the used electrode, however, is removed at the other side of the working path.

The wire electrode is a preferred tool for electro-erosive or electro-chemical treatment of workpieces in which complicated prismatic contours are to be cut, particularly when the requirements for accuracy are high. It is customary to control the process by electronic control apparatus, rather than manually, preferably by a machine coupled to a numerical machine tool control unit. Such units are described, for example, in the following cross-referenced U.S. Pat. Nos. 3,439,146 ULLMANN et Donati, 3,581,043, 3,581,045, 3,731,043 ULLMANN et al.

The quality of work turned out in electro-erosive cuttings is high; such high-quality results can be obtained, however, only if the quality of guidance and of the tension placed on the wire can meet the high requirements regarding uniformity of control and uniformity of tension of the wire in the working path, and especially in the working zone. The pay-out spooling and take-up spooling systems have to meet special requirements of quality regarding uniformity of supply and take-up; one such apparatus is described in cross-referenced U.S. Pat. No. 3,822,374. This patent relates to segregating the working path through which the electrode wire passes from interfering detrimental influences which can react on the wire due to non-uniformities arising at the supply or take-up thereof, or in the wire itself. This isolation of the working path is obtained by providing two pinch roller pairs to separate the working path from the path taken by the wire between the pinch rollers and the respective supply and take-up reels. One of the pinch roller pairs is used to select the wire supply speed; the second pinch roller pair is driven with a controlled torque and at a controlled speed which is so arranged that a predetermined tension is maintained in the working path; the control system maintains this tension automatically. Uniformity of tension can be obtained by a system in accordance with this patent to ±5%. The response delay of the controlled motor does, however, interfere with prompt reaction of the motor on the wire and proves bothersome since the drive which pulls the wire off is loaded not only by the forces arising in the working path itself but also by pull-off forces arising in the take-up mechanism. These additional forces are small, but cannot be neglected.

THE INVENTION

It is an object to provide a further improvement in the uniformity of wire tension in electro-erosive cutting apparatus using, in general, the system of the cross-referenced U.S. Pat. No. 3,822,374 and, particularly to control the wire tension so that it will not vary by significantly more than 1% of a predetermined tension value—and preferably will be less than 1% of such tension value regardless of non-uniformities in the wire, e.g. its composition or hardness. Additionally, other non-uniformities should be compensated which can arise within the working path, for example due to variations in the coefficient of friction at the pull-off side with respect to the associated pull-off mechanism. In general, it is an object to improve the quality of electro-erosive or electro-chemical cutting apparatus to provide workpieces of still higher accuracy and quality.

It is yet another object to decrease the mechanical and electrical components used in electro-erosive apparatus, and to eliminate devices disclosed in the cross-referenced U.S. Pat. No. 3,822,374 to change the clamping or pinch forces between the pinch rollers, as well as electronic control systems to control a second motor.

SUBJECT MATTER OF THE PRESENT INVENTION

Briefly, both pairs of pinch rollers are driven by motor with fixed torque transfer between the motors and the pinch rollers, so that the working path of the electrode will be isolated from variations arising due to spooling or winding operations, both on the pay-out as well as on the take-up side of the electrode wire. A loading arrangement is additionally applied to the electrode wire and located between the pinch rollers on the supply or advancing side and the work zone, the loading arrangement loading the electrode wire to the predetermined tension. The loading arrangement provides a constant stress, or tension on the wire. It is coupled to a servo control circuit to provide for regulation or adjustment of the supply, speed of the pinch rollers e.g., by controlling the motor, in order to compensate for the elongation of the electrode wire due to the loading.

Drawings Illustrating a Preferred Example

The single FIGURE is a schematic part block diagram illustrating the invention, to be considered together with the drawings of the cross-referenced U.S. Pat. No. 3,822,374, and in which parts similar to those of the cross-referenced U.S. Pat. No. 3,822,374 have been given the same reference numerals.

Wire electrode 1 is supplied from a supply reel, not shown, at the advancing, feed or supply side through a pair of pinch rollers 3, 4. The pinch rollers, or at least one of them, are driven through a gearing 6 from a motor 5, so that the pinch rollers will have the torque developed by the motor transferred thereto. The drive by the motor is with a predetermined speed. Wire 1 is then guided over deflection rollers or deflection stubs 7, 8 to a second pair of take-up or pull-off pinch rollers 10, 11, at least one of which is driven through a gearing 13 by a motor 14, with stiff torque transmission between the motor and the pinch rollers. The speed of motor 14 is controllable. The working zone 9 extends between the guide heads or stubs 7, 8. The wire removed by the pull-off pinch rollers 10, 11 is reeled on a used wire-reel, not shown.

The speed of the motors 5, 14 are controlled by a control input schematically shown at 231 to a motor controller 230. The control input may, for example, be an automatic numerical machine tool control input by means of magnetic tape, punched tape, or the like, or may be a manually controlled input by manual motor controllers. Preferably, the control unit 230 is an automatically operating motor controller responding to numerical machine tool control signals. The necessary tension in the working loop and particularly in the work zone 9 of the wire 1 is controlled, in accordance with the present invention, by loading the wire in a region or zone between the work zone 9 and the feed pinch roller pair 3, 4. This loading is effected by, a static wire stressing means, comprising a weight 221 hanging on a pulley 220. The stress is thus independent of movement of the wire. A further pulley 223 is fixed in place, for example by being secured to the frame of the machine, as schematically shown. The loading force of load 221 corresponds to the weight thereof, and can readily be selected in accordance with operating requirements; it determines the wire tension in the work zone 9. The guide heads 7, 8, and particularly the guide head 7, have low-friction characteristics so that the wire tension is uniform and appears essentially without changes or spurious disturbances in the work zone and cannot be influenced by changes in friction of the used wire between the pull-off pinch rollers, or with respect to other equipment with which a wire is in contact. Specifically, the friction of the wire 1, after having passed through the work zone and after having then become deteriorated with respect to the pull-off head 8, is almost impossible to control and/or maintain uniform. The constant drive of the pull-off pinch roller pair 10, 11 through gearing 13 limits the influences on variations in tension on the wire in the portion of the loop between the pull-off guide 8 and the pull-off pinch rollers 10, 11. Additional variations in tension on the wire due to changes in reeling conditions of the wind-up reel (not shown) cannot be transferred back to the work zone 9 since the pull-off pinch rollers 10, 11 are positively driven through gearing 13 from motor 14.

Various arrangements can be used to provide a uniform tensioning force on the wire 1 in the work zone 9. The illustrated arrangement shows the pulley 220 slidably secured in bearings 224 and fixed to the frame of the machine. Other arrangements are likewise possible, such as guiding pulley 220 by means of membrane springs or over lever arrangements. Weight 221 is shown directly applied to pulley 220; various transmission systems using weights and transmission levers may also be used, or springs or electromagnetic, hydraulic of pneumatic loads can be applied to pulley 220. It is important to so design the loading, however, that change of the position of the pulley 220, or its equivalent, due to elastic elongation of the wire upon introducing the loading stress on the pulley, does not change the direction of the intended force. Thus, systems using levers or other pivoted elements must be arranged with a view to provide only a small deflection angle.

The loading of pulley 220 by a weight provides for continuous stressing, resulting in elongation of the wire 1 being applied to the work zone 9. The speed of motors 14 and 5 thus must be slightly different in order to compensate for the elongation of the wire. The system, as shown, thus is so arranged that the motor 5 driving the pinch roller pair 3, 4 is adjusted in such a way that the speed of the feed pinch roller is slightly less than the speed of the pull-off pinch rollers 10, 11. The respective speeds are so set that the loading pulley 220 and hence the weight 221, always maintains the same position. A servo feedback loop is provided to measure deflection of the weight 221 and to feed corrective speed information to control motor 5 to correct any deviation. A position transducer 222 is coupled to the pulley 220 to determine its deflection from a predetermined position corresponding to a predetermined strain of wire 1 in work zone 9. Suitable position transducers are, for example, potentiometers, inductive, optical or capacitative transducers, or the like; active transducers, such as rotary transducers, may also be used. For example a wire 1 of copper material, and of circular cross section with a diameter of 0,2 mm was loaded by a weight 221 of 0,5 kg, resulting in a path length between advancing feed pinch rollers 3, 4, and pull-off pinch rollers 10, 11, of 200 cm in an elongation of 1 mm. Movement of the weight 221, due to changes in wire composition, characteristics, e.g. wire hardness operating conditions in the work zone 9, and the like, resulted in changes in deflection of the weight 221 of 0.5 mm, which can readily be measured by a position transducer of the magnetically variable resistor type. The signal output 235 from transducer 222 is applied to a preamplifier 236; the amplified signal is applied to a mixer circuit 233 which modifies the speed control signal 232 derived from motor 230 such that the signal 234 applied to the motor 5 will result in a speed thereof, transmitted to the pinch rollers 3, 4, which compensates for the change in elongation of the wire. Preamplifier 236 is not strictly necessary and its use may depend on the selected type of position transducer 222 and the requirement for precision of the position of the pulley 220. The preamplifier 236 may be so arranged that its output signal can be directly processed in mixer circuit 233. The control input 231 can be given from a setting-potentiometer. The motor controller 230 can be a commonly variable DC-source or a separately variable DC-source; preamplifier 236 can be an ordinary operational amplifier connected as a proportional amplifier with the subsequent power stage, to accept the signals from position transducer 222 and applying output signals to a mixer circuit 233 which, if the motor controller 230 provides an analog output, can be an additional modulator of the output of signal 232 such as a parallel booster and attenuator circuit controlled from the power output of preamplifier 236 in accordance with change in position of the position transducer 222; if motor 5 is controlled by digital or pulsed signals, mixer circuit 233 can be an additional phase control circuit lengthening or shortening the pulses applied to the motor 5, or changing the duty cycle of the pulses applied to motor 5.

The system provides excellent damping and, particularly when combined with the feedback loop sensing change in position of pulley 220, can eliminate changes in friction, effects due to dirt, contamination, or wear in any one of the rollers or in the wire guide heads 7, 8, as well as effects of other interfering disturbances in the work zone 9. Additionally, differential elongation due to differences in the characteristics of the wire being supplied, for example variations in hardness thereof, which are sometimes unavoidable in the process of manufacture of the wire, will likewise be automatically compensated for.

Various changes and modifications may be made within the scope of the inventive concept.

We claim:

1. In combination with an electrical discharge machine an apparatus for pulling a wire with a predetermined speed and tension through a work zone, comprising wire feeding means which feed the wire at a controlled rate into a wire path from one end of the path, including a pair of feed pinch roller means, of which at least one is driven;

wire take-up means which take up the wire at the other end of the wire path at a controlled, substantially constant rate which is higher than the feeding rate of said feed pinch roller means, including a pair of take-up pinch roller means, of which at least one is driven, the wire path being a low-friction path and including the work zone along a segment thereof in which the wire is utilized to perform electrical discharge machining function;

static wire stressing means located between said feeding means and the work zone, said stressing means determining substantially the entire tension of the wire in the work zone and comprising a fixed, upper pulley and a movable lower pulley located between said feeding pinch roller means and the working zone, whereby tension in the wire will have the tendency to pull the lower pulley towards the upper fixed pulley, the wire being looped about both of said pulleys, and a tension force applying means connected to said movable lower pulley acting in a direction counter the direction of pull exerted by said wire on the movable pulley to provide a predetermined tensioning force for the wire to thereby determine substantially the entire tension of the wire in the working zone, the position of said movable pulley changing with respect to said fixed, upper pulley upon change in elongation of said wire between the feed pinch roller means and the take-up pinch roller means;

means measuring the deflection of said movable pulley upon changes in elongation of the wire and providing a wire path length signal;

and feed control means which receive the wire path length signal and control the feeding rate of said feeding pinch roller means to null said deflection and thus maintain a time-averaged constant length of wire between said feed pinch roller means and said take-up pinch roller means.

2. Apparatus according to claim 1, wherein the tension applying means comprises a hanging weight to determine the stressing force and hence the tension in the wire.

3. Apparatus according to claim 1, wherein the means measuring the deflection of said movable pulley comprises a potentiometer-type distance position transducer.

4. Apparatus according to claim 1, wherein the means measuring the deflection of said movable pulley comprises a mechanical distance-to-electrical signal transducer.

5. Apparatus according to claim 1, wherein said feed control means comprises a feedback circuit responsive to said wire path length signal.

6. A method of controlling the tension of a wire tool of an electrical discharge machine in a working zone of a wire path, comprising the steps of feeding the wire at a controlled feeding rate from a feeding position into the wire path which includes the working zone as a segment thereof;

forming said path as a low-friction path;

taking up the wire from the wire path at a take-up position and at a constant take-up rate which is greater than the feeding rate to compensate for elongation of the wire between said positions;

applying a static stressing force including gravity to the wire in the section of the wire path between the feeding position and the work zone by passing the wire about a tensioning pulley hanging in a loop of the wire thereabout in advance of the work zone, whereby the wire will exert a radial pull on the pulley which will subject the wire to a tensioning force which will act on the pulley in the direction counter the direction of radial pull exerted by the wire as it passes about the pulley to determine substantially entirely the tension of the wire in the work zone;

sensing deflection of the position of said tensioning pulley as influenced by changes in the length of wire between said feeding position and said take-up position to thereby determine changes in strain of the wire in the wire path as a result of said applying of the stress force, and controlling the rate of said feeding as a function of sensed change in the position of said loading weight to maintain a time-averaged constant length of the wire between said feeding position and said take-up position and hence the loading weight at a predetermined position in the wire path.

* * * * *